United States Patent
Pelton et al.

(10) Patent No.: US 7,892,681 B2
(45) Date of Patent: Feb. 22, 2011

(54) SYSTEM OF DISTRIBUTED ELECTROCHEMICAL CELLS INTEGRATED WITH MICROELECTRONIC STRUCTURES

(76) Inventors: Walter E. Pelton, 3584 Lancelot Ct., Fremont, CA (US) 94536; Paul J. A. Kenis, 2208 S. Staley Rd., Champaign, IL (US) 61822

( * ) Notice: Subject to any disclaimer, the term of this patent is extended or adjusted under 35 U.S.C. 154(b) by 1235 days.

(21) Appl. No.: 11/489,274

(22) Filed: Jul. 18, 2006

(65) Prior Publication Data
US 2007/0020496 A1    Jan. 25, 2007

Related U.S. Application Data

(60) Provisional application No. 60/700,954, filed on Jul. 19, 2005.

(51) Int. Cl.
*H01M 8/04* (2006.01)
*H01M 8/10* (2006.01)

(52) U.S. Cl. .................. 429/428; 429/465; 429/492; 429/513; 429/517

(58) Field of Classification Search ............ 429/12–46, 429/400–535, 428, 465, 492, 513, 517
See application file for complete search history.

(56) References Cited

U.S. PATENT DOCUMENTS

| | | | |
|---|---|---|---|
| 3,350,227 A * | 10/1967 | Moerikofer et al. | 429/17 |
| 6,312,846 B1 * | 11/2001 | Marsh | 429/30 |
| 6,735,610 B1 | 5/2004 | Pelton | |
| 6,820,104 B2 | 11/2004 | Pelton | |
| 7,120,659 B2 | 10/2006 | Pelton | |
| 2002/0004165 A1 * | 1/2002 | Akita | 429/126 |
| 2002/0177015 A1 * | 11/2002 | Fuglevand | 429/12 |
| 2005/0010627 A1 | 1/2005 | Pelton | |
| 2005/0256918 A1 | 11/2005 | Pelton | |
| 2006/0206553 A1 | 9/2006 | Pelton | |

FOREIGN PATENT DOCUMENTS

WO   WO2005/111857   11/2005

OTHER PUBLICATIONS

Lee et al., Design and fabrication of a micro fuel cell array with "flip-flop" interconnection, Nov. 2002, Journal of Power Sources, vol. 112, pp. 410-418.*
U.S. Appl. No. 10/971,568, filed Oct. 22, 2004, Abandoned.
S. Ha et al., Direct Formic Acid Fuel Cells with 600mA $cm^{-2}$ at 0.4 V and 22 °C; Fuel Cells 2004, 4, No. 4, pp. 337 to 343.
Ranga S. SaJayashree et al., Air-Breathing Laminar Flow-Based Microfluidic Fuel Cell; Journal of American Chemical Society, 2005, 127, 16758-16759.

(Continued)

*Primary Examiner* — Basia Ridley
*Assistant Examiner* — Jonathan G Leong

(57) ABSTRACT

An electrochemical cell includes an anode half-cell and a cathode half-cell. A separator, such as a membrane, is formed between the two half-cells, and a gate electrode may be configured to influence the properties of the separator. Electricity is generated by flowing a liquid fuel through conduits, while applying an electric field to the gated membrane such that the membrane conducts protons. Complementary half cell reactions take place at an anode and a cathode.

13 Claims, 13 Drawing Sheets

OTHER PUBLICATIONS

Ha, S.; Dunbar, Z.; Masel, R. I. Characterization of High Performing Passive Direct Formic Acid Fuel Cell. Journal of Power Sources (2006), 158(1), 129-136.

Thomas et al., 1999, Fuel Cells Green Power, Los Alamos National Laboratory LA-UR-99-3231.

Motokawa et al., MEMS-Based Design and Fabrication of a New Concept Micro Direct Methanol Fuel Cell (μ-DMFC), Apr. 30, 2004, Department of Applied Chemistry, Waseda University, Tokyo, Japan.

Motokawa et al., Fabrication Process of Sloped Micro-Channel Electrodes for μ-DMFC, Feb. 15, 2005, School of Science and Engineering, Waseda University, Tokyo, Japan.

Motokawa et al., A Micro Direct Methanol Fuel Cell Using Platinum and Platinum-Ruthenium Electroplated Microchannel Electrodes, Feb. 1, 2005, Graduate School of Science and Engineering, Waseda University, Tokyo, Japan.

* cited by examiner

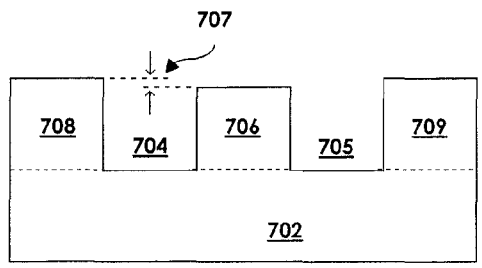
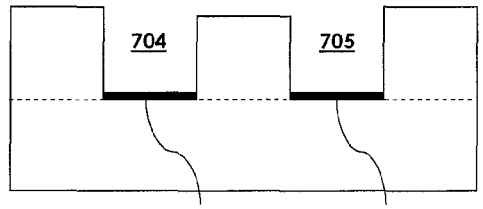
FIG. 7A　　　　　　　FIG. 7B
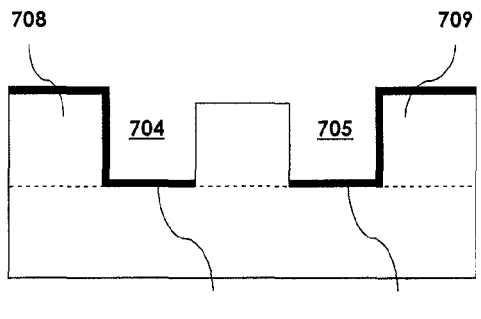
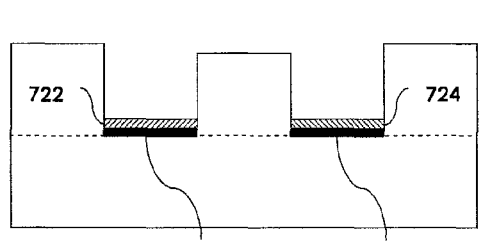
FIG. 7C　　　　　　　FIG. 7D
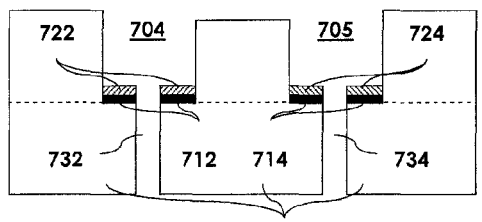
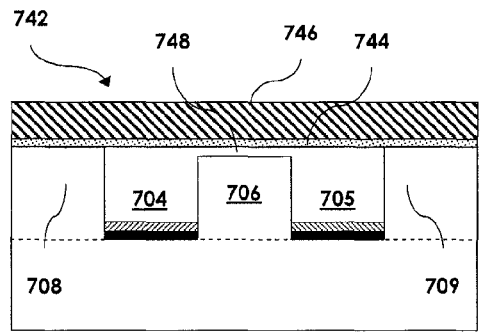
FIG. 7E　　　　　　　FIG. 7F

SYSTEM OF DISTRIBUTED ELECTROCHEMICAL CELLS INTEGRATED WITH MICROELECTRONIC STRUCTURES

REFERENCE TO RELATED APPLICATIONS

This application claims the benefit of U.S. Provisional Application No. 60/700,954 entitled "Methods and apparatuses for distributed fuel cells with transistor system" filed Jul. 19, 2005, which is incorporated by reference in their entirety, except where inconsistent with the present application.

BACKGROUND

The distribution of power to support large sets of circuit modules has been challenging because the required voltages and acceptable voltage variances both continue to decrease, while the required peak currents continue to increase. For example, a communications processor currently requires a power source that can provide high current at a low voltage, and a large number of capacitors of multiple values to smooth out high frequency edges and meet surges that fall into different ranges between the high frequency and the response capability of the power supply. Integrated circuit technology has been able to replace the functionality of many devices in digital logic and to produce many analog devices compatibly on a substrate. Power sources have been necessarily handled from outside the chip and this has required lossy and bulky structures to implement power paradigms that maintain low power supply regulated voltage with respect to a common ground. In addition, it is common to have multiple voltage requirements for a single central processor unit. Furthermore, the power is routed by many conductive traces, where even a slight resistance causes large differential voltage drops. No small, efficient power source has been able to be integrated on the chip with the logic. No power source has been able to be produced in the wafer processing cycle without individual manual operations being done to install special elements such as membrane materials. As a result, no simple biasing paradigms have been developed to permit the lower power and higher speeds that can be achieved.

An electrochemical cell is an example of a bias source that may have millimeter or nanometer dimensions. An electrochemical cell includes two half-cells, each of which includes an electrode and a reagent. The reagent in one half-cell undergoes an oxidation reaction at the anode, producing electrons as one reaction product. The reagent in the other half-cell undergoes a reduction reaction at the cathode, consuming electrons as a reactant. Ionic balance between the two half-cells is maintained by an ion-conducting interface between the half-cells. The electron flow from the anode to the cathode will provide an electrical current to an electrical load connected to the two electrodes.

In order for complementary half-cell reactions to take place in an electrochemical cell, ions must travel between the two electrodes. In a conventional electrochemical cell, an ion conducting interface is present between the electrodes. The interface prevents bulk mixing of the reductant and oxidant, but permits ions to flow between the two electrodes. Examples of ion conducting interfaces include a salt bridge, a polymer electrolyte membrane, and an induced dynamic conducting interface (IDCI). Electrochemical cells that include an IDCI are described, for example, in U.S. Pat. No. 6,713,206 B2.

The reagent in the half-cell containing the cathode is an oxidant, since it undergoes a reduction reaction at the cathode. The reagent in the half-cell containing the anode is a reductant, since it undergoes an oxidation reaction at the anode. The electrons produced at the anode can travel through an external circuit to the cathode, where electrons react with the oxidant at the cathode catalyst to produce a reduced product. When the electrochemical cell is a fuel cell, the reductant is a fuel.

Hydrogen, methanol and formic acid have emerged as important fuels for fuel cells, particularly in mobile power and transportation applications. The electrochemical half reactions for a hydrogen fuel cell are listed below.

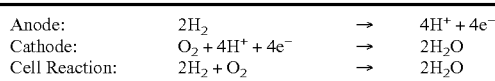

To avoid storage and transportation of hydrogen gas, the hydrogen can be produced by reformation of conventional hydrocarbon fuels. In contrast, direct liquid fuel cells (DLFCs) utilize liquid fuel directly, and do not require a preliminary reformation step of the fuel. As an example, the electrochemical half reactions for a Direct Methanol Fuel Cell (DMFC) in acidic conditions are listed below.

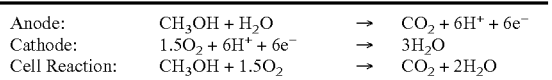

As another example of a DLFC, the electrochemical half reactions for a Formic Acid Fuel Cell (FAFC) in acidic conditions are listed below.

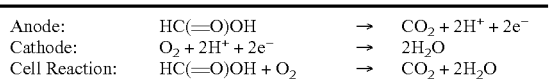

Several types of fuel cells have been constructed, including polymer electrolyte membrane fuel cells, direct methanol fuel cells, alkaline fuel cells, phosphoric acid fuel cells, molten carbonate fuel cells, and solid oxide fuel cells. For a comparison of several fuel cell technologies, see Los Alamos National Laboratory monograph LA-UR-99-3231 entitled *Fuel Cells: Green Power* by Sharon Thomas and Marcia Zalbowitz.

SUMMARY

In one aspect, the invention is an electronic device, comprising an integrated circuit comprising a plurality of domains, and at least one bias source. Each domain of the plurality of domains is independently electrically connected to at least one of the at least one bias source.

In another aspect, the invention provides a method and process to integrate fuel cells with logic at the design level and fabricate them together in a wafer process in a foundry including support of reactant reconstitution and recirculation.

In another aspect, the invention provides a high specific energy fuel cell that can be fabricated in plastic and various materials and with efficient processes such as to be arrayed three-dimensionally.

In yet another aspect, the invention provides a gated fuel cell that can be quickly switched on or off or controlled to provide variable output power.

In yet another aspect, the invention provides a contamination-limited provision and replenishment of the reactants.

The following definitions are included to provide a clear and consistent understanding of the specification and claims.

The term "electronic device" is a device that includes an electrical circuit. Electronic devices include, for example, microprocessors, application-specific integrated circuits (ASICs), memory chips, analog integrated circuits, computers, mobile phones, airplanes or automobiles.

The term "integrated circuit" includes all the semiconductor devices on a single semiconductor substrate, configured to provide an electrical output or outputs in response to an electrical input or inputs.

The term "domain" is one or more independently electrically connected section of an electrical circuit. Domains include, for example, logic domains, arithmetic domains and memory domains.

The term "semiconductor device" includes a solid-state circuit element. Semiconductor devices include, for example, resistors, capacitors, p-n diodes, bipolar junction transistors, and field-effect transistors.

The term "bias source" is an element that increases or decreases the electrical potential applied to a system. Examples include fuel cells, batteries, and power supplies.

The term "independently electrically connected" is a circuit portion that may be biased without changing the biasing state any other circuit portions electrically connected to some bias source.

The term "cell" includes one or more of cells interconnected to provide a desired electrical property.

The term "membrane" encompasses a material between two half-cells forming part of the current path and which has properties that differ from those of the half-cell reactants. Such properties generally include being solid rather than liquid plus other properties that may be optimized in the construction of a cell. This term is usually limited to a continuous chemical substance.

The term "structured membrane" is a structural device that is typically not ion-conductive with inclusions of ion-conductive chemicals. The entire device may be made part of the path between two half-cells and will function as a membrane. The structural lattice extends the solid near the structural elements but with the extended material being ion-conductive. This ordered lattice may extend completely between members of the fine structure of solids and may thus behave as a true membrane. In other cases the ordering may only include part of the intra-structural space and the membrane may be only a shield with holes which can limit flow between the half-cells but not withstand pressure. For the present purpose the term will include both cases and assume that any final design will accommodate the actual case. Examples include slots cut into surfaces of silicon and then oxidized to a form a surface of silicon dioxide and filled with water with some concentration of acidic ions or a gel of sodium silicate filling a space and maintaining a structure of threads that produce an aqueous form with structural properties but permeable to mobile carriers, an ion-permeable substance in a form that is altered by the proximity of the sides of the slot.

The term "membrane gate" is a liquid or solid portion of the conduction path between two half-cells having ionic conductivity that may be changed by application of an electric field.

The term "porous matrix" may include an amorphorous type of the structured membrane which differs by having been formed in a pseudo-random process as opposed to photo-mask and etch procedures. Examples include porous silicon, sand and silicon carbide bounded by silicon dioxide or silicon nitride surfaces and including water molecules.

BRIEF DESCRIPTION OF THE DRAWINGS

The invention may be better understood with reference to the following drawings and description. The components in the figures are not necessarily to scale, emphasis instead being placed upon illustrating the principles of the invention.

FIG. 7A through FIG. 7F are representations of structures formed during an example of a method of making a gated electrochemical cell having a membrane gate that includes a structured field effect material.

DETAILED DESCRIPTION

Embodiments of the present invention make use of the fact that integrated circuit domains in a microelectronic device may be operated with separate bias sources. The paradigm replaces the common ground approach with a common threshold. The only currents between domains is then the gate charging current. Leakage currents during transfer between high and low states is a local bias power factor and does not influence the signal path. Moreover, an individual bias source may be integrated with its corresponding integrated circuit domain, providing a source of bias that is available to the domain. Distributing multiple bias sources allows reduction or elimination of the power distribution and regulation system of the device, reducing or eliminating the space and power otherwise used by the power distribution and regulation system. Furthermore, each integrated circuit domain may be supplied with power only when necessary by virtue of the gating feature. In some embodiments, the bias sources are electrochemical cells, such as fuel cells. Alternatively, each domain power node may be connected to a pin, allowing each domain of the integrated circuit to be independently electrically supported by an external bias source or capacitor when appropriate.

The embodiments also include the development of an electrochemical fuel cell that may be switched on and off by applying a bias to the gate. Such an electrochemical cell may be a bias source for an integrated circuit domain, and may be integrated with the domain; both the bias source and the domain to which it is electrically connected may cohabit the same semiconductor substrate. By distributing multiple electrochemical cells as bias sources in a device, each integrated circuit domain may be supplied with power only when necessary, because the electrochemical cells may be switched on and off. The resulting chip, powered by distributed fuel cells, can operate with substantially reduced electrical noise, higher speed and less total power.

Figure 1:
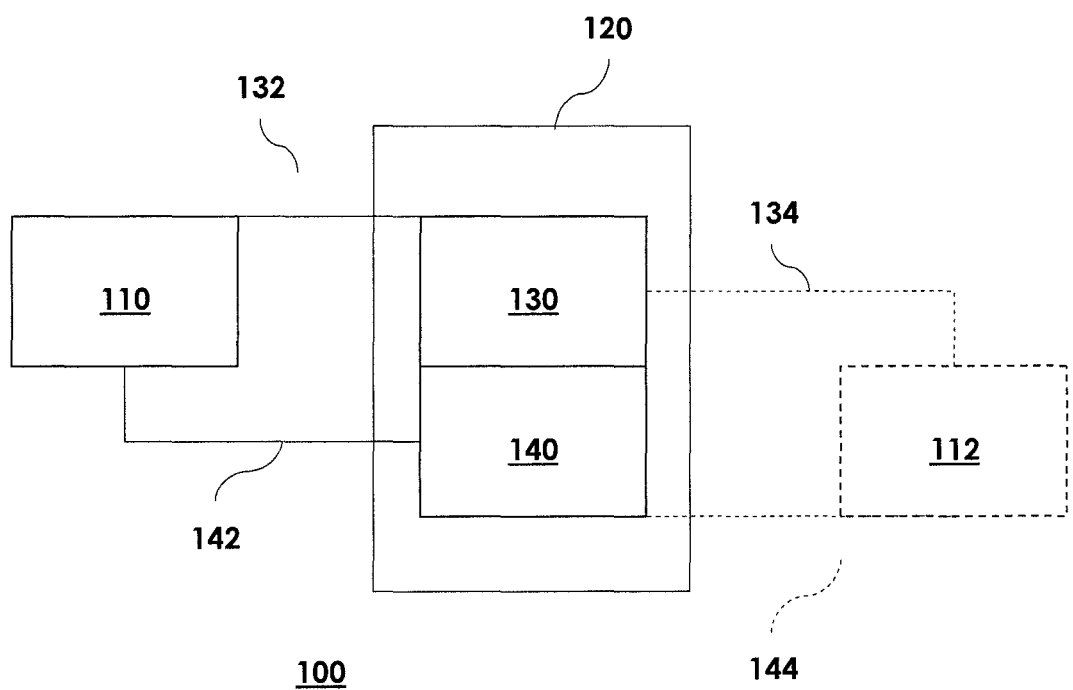
FIG. 1 is a schematic representation of an electronic device.

FIG. 1 is a schematic representation of an example of an electronic device 100 including a bias source 110 and an integrated circuit 120, which includes domains 130 and 140. Electronic device 100 may also include optional bias source 112. If bias source 110 is the only bias source in the device, domains 130 and 140 are independently electrically supported by the bias source through connections 132 and 142, respectively. If the device includes two bias sources, domain 130 may be connected to bias source 110 through connection 132, and domain 140 may be connected to bias source 112 through connection 144. Alternatively, domain 130 may be independently electrically supported by bias source 110 through connection 132 and independently electrically supported by bias source 112 through connection 134, and domain 140 may be independently electrically supported by bias source 110 through connection 142 and independently electrically supported by bias source 112 through connection 144.

The bias source may provide a portion of the bias required by the domain that is independently electrically supported by it, or it may provide all of the bias required. A baseline electric potential may be provided by another bias source. In one example, a baseline electric potential is provided by a primary power supply connected to the device. This level may preserve the state of the logic but not be sufficient for performing logical operations. In this example, the bias source may only need to provide an increase or decrease in the potential applied to a particular domain. In some embodiments, an electronic device includes a bias source corresponding to each domain in the integrated circuit. Alternatively, multiple bias sources may each be independently electrically connected to a plurality of domains, allowing individual domains to be biased by different bias source at different times. In another alternative arrangement, multiple domains may each be independently electrically connected to a plurality of bias sources. In a typical design the fuel cell may be sufficient for the average current to bias the domain and an external capacitor may be provided that will assume the load under certain circumstances for example a memory block might justify such an arrangement.

A bias source can be any source of electrical potential. Electrical potential sources include, for example, generators and electrochemical cells. Examples of electrochemical cells include batteries and fuel cells. For an electronic device that includes more than one bias source, the individual bias sources may be of the same type, or they may be of different types. In some embodiments, the bias source is small, lightweight and has a long operational lifetime. An important feature is if it is integral to the logic of the chip and can be optimized by a compiler.

The bias source is may be a fuel cell. Fuel cells can operate continuously for an indefinite period of time, provided that fresh reagent is supplied to each half-cell and that the electrodes are not consumed or contaminated. Microfluidic systems can be used to provide a flow of fresh reagent to the half-cells. The use of a digitally controlled fuel refreshment system incorporating a piezoelectric diaphragm pump, heat exchange, membranes for carbon dioxide, water and oxygen exchange with enough volume to act as a mixing reservoir allows the fuel cells to be supported in an optimized manner. The pump can be controlled to use several steps in each direction according to the volume of the plumbing on the chip. The digital control allows the same support module to power a very wide range of power levels and facilitates high volume, low cost.

An electrochemical cell consumes an oxidant and a reductant. Examples of oxidants for electrochemical cells include ozone, oxygen, fluorine, chlorine, bromine, iodine, metal salts and metal oxides that can be reduced to a lower oxidation state. For example, $MnO_{4-}$ can be reduced to $Mn^{2+}$ in the presence of a platinum catalyst in an acidic environment, consuming an electron.

Examples of reductants for electrochemical cells include sulfur, and metals, metal salts and metal oxides that can be oxidized to a higher oxidation state. For example, $Fe^{2+}$ can be oxidized to $Fe^{3+}$ in the presence of a platinum catalyst, producing an electron. Examples of reductants also include fuels, such as hydrogen or an oxidizable organic compound. In this example, the electrochemical cell is a fuel cell. In some embodiments, the electrochemical cell bias source is a fuel cell, and may use hydrogen, methanol or formic acid as the fuel.

Figure 2:
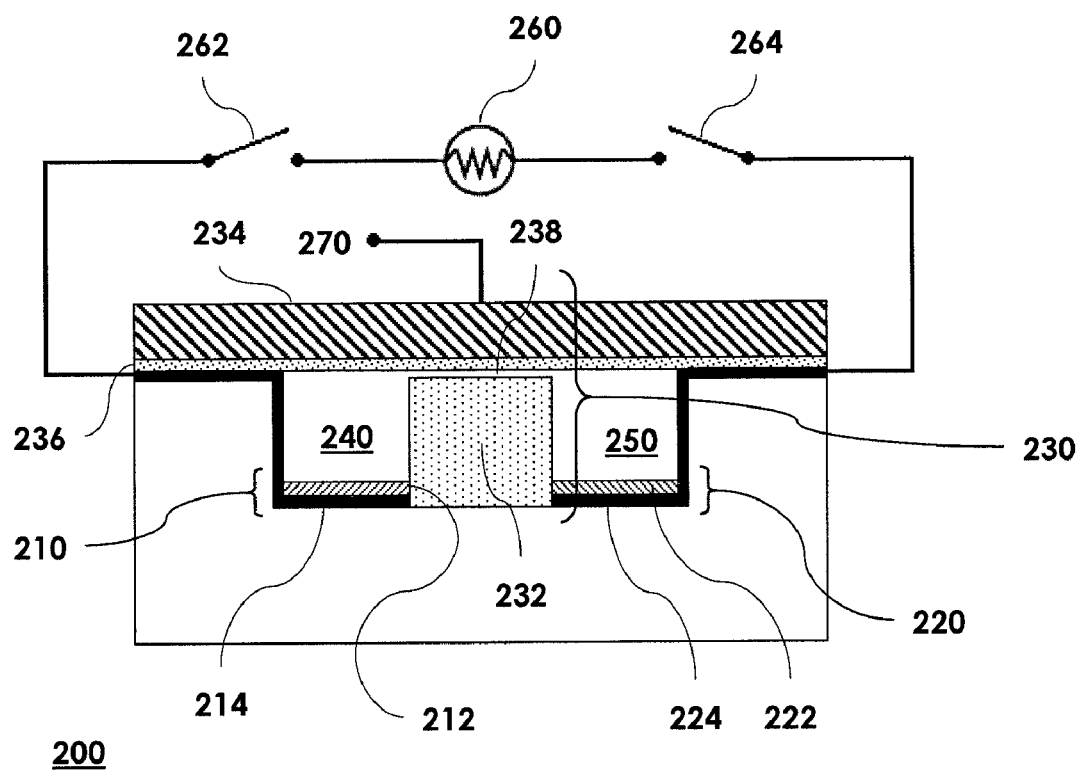
FIG. 2 is a representation of a gated electrochemical cell.

FIG. 2 represents an example of a gated electrochemical cell 200 including an anode 210, a cathode 220, a membrane gate 230 between the anode and the cathode, a first conduit 240 contiguous with the anode and one side of the membrane gate, and a second conduit 250 contiguous with the cathode and the other side of the membrane gate.

The anode 210 includes an anode catalyst 212 and a conductive contact 214. The anode catalyst includes a material that catalyzes the oxidation of a reductant. Examples of anode catalysts include platinum, and combinations of platinum with ruthenium, tin, osmium or nickel.

The conductive contact 214 may be a conductive material, such as a metal, a conducting polymer, or doped polycrystalline silicon. The conductive contact may be connected to an electric load 260 or to an optional switch 262 that can connect the contact and an electric load.

The first conduit 240 allows a fluid, such as a liquid, to flow in contact with the anode 210 and one side of the gate-controlled membrane 230. The fluid may include a reductant that is oxidized at the anode catalyst. The reductant may be hydrogen, or an oxidizable organic compound. Examples of oxidizable organic compounds include organic molecules having one or more carbons but not having adjacent alkyl groups, and where all carbons are either part of a methyl group or are partially oxidized. Examples of such oxidizable organic molecules include methanol, formaldehyde, formic acid, glycerol, ethanol, isopropyl alcohol, ethylene glycol and formic and oxalic esters thereof, oxalic acid, glyoxylic acid and methyl esters thereof, glyoxylic aldehyde, methyl formate, dimethyl oxalate, and mixtures thereof.

The cathode 220 includes a cathode catalyst 222 and a conductive contact 224. The cathode catalyst includes a material that catalyzes the reduction of an oxidant. Examples of cathode catalysts include platinum, and combinations of platinum with cobalt, nickel or iron.

The conductive contact 224 may be a conductive material, such as a metal, a conducting polymer, or doped polycrystalline silicon. The conductive contact may be connected to an electric load 260 or to an optional switch 264 that can connect the contact and an electric load.

The second conduit 250 allows a fluid to flow in contact with the cathode 220 and the other side of the membrane gate 230. The fluid may include an oxidant that is reduced at the cathode catalyst. Examples of oxidants include ozone, hydrogen peroxide, permanganate salts, manganese oxide, fluorine, chlorine, bromine, and iodine. The first and second conduits 240 and 250 may have the same dimensions, or they may have one or more dimensions that are different.

The fluids in conduits 240 and 250 during operation of the cell may be stationary, or one or both may flow. If the fluids are flowing, the flow rates and pressures may be the same or different. The flow in the conduits may be laminar, having minimal or no turbulence, the flow may be turbulent, or the flow may be switched between laminar and turbulent. In one example, the flow is turbulent at least part of the time during operation to regenerate the fluid composition in contact with the electrodes. The fluids in the conduits may independently flow in pulses. In one example, a flow pulse serves to regenerate the reactant concentration in the conduit, which is then depleted by reaction at the electrode. The flow may be pulsed again to bring fresh fluid into the conduit. This may be achieved with a digitally controlled pump. The structure shown may be achieved by etching a silicon wafer as part of a process in a silicon foundry or by stamping, rolling or pouring plastics and may be used to satisfy a wide variety of applications. The short distance between the electrodes provides a high energy density as the cell dimensions shrink and therefore adapt easily to matrix formats for high power.

In addition to including an oxidant or reductant, the fluids in the conduits 240 and 250 independently may include a carrier gas or liquid. A carrier liquid may contain one or more solvents, and optionally may contain one or more other components, such as a salt, a reaction mediator, an acid, a base, a stabilizer, a buffer, an electrolyte, and a viscosity modifier. The compositions of the carrier gases or liquids in each conduit may be the same or different.

The membrane 230 includes a solid structural material 232, a gate electrode 234, and a gate insulator 236 between the field effect material 232 and the gate electrode 234. In some embodiments the field effect material 232 will contact the gate insulator 236. An example of the field effect material would be silica gel wetted with electrolytes. The gate electrode may be connected to an electric potential source 270 with respect to the electrodes and reactants.

In other embodiments the solid field effect material 232 will not contact the insulator 236 in which case the field effect material in the structured membrane slot 238 may be any material having an ionic conductivity that can be changed by application of an electric field, for example water. The field effect material may be a single material, or it may be a composite material. For example, field effect material in the structured membrane slot 238 may include a substrate material that is unaffected by an applied electric field, for example silica gel and another material such as water that are in contact with the fluids in the electrochemical cell.

The field effect material 232 may be a structured field effect material, which includes one or more ion-conductive material channels connecting the conduits 240 and 250. The field effect material 232 may be a porous field effect material, which either may contact the gate insulator 236 or may be separated from the gate insulator.

A structured membrane may include a slot 238 as the ion-conductive material channel, as represented in FIG. 2. The slot may extend for a portion or for the entire length of the conduits 240 and 250. The height dimension of the slot between the structured membrane and the gate insulator 236 is a fraction of the width dimension across the field effect material. The ion-conductive material channel of a structured membrane may have geometries other than a horizontal slot. In one example, a structured membrane includes one or more vertical slots between the conduits. A vertical slot may extend over part or all of the height of the conduits, and has a length dimension that is a fraction of its width dimension across the membrane. In another example, a structured membrane includes one or more capillaries between the conduits. A capillary has a length dimension and a height dimension that are fractions of the width dimension. The field effect material in these examples may or may not have a separation from the gate insulator 236. In one embodiment the structured membrane may be a sponge-like material such as porous silicon.

The gate electrode 234 is a conducting material, such as a metal, a conducting polymer, or doped polycrystalline silicon. The gate electrode is electrically connected to a switch that can apply an electric potential to the electrode.

The gate insulator 236 may include a dielectric material. Examples of dielectrics include silicon oxide, silicon oxynitride, silicon nitride, as well as high-K dielectric materials. The gate insulator 236 may be in contact with the field effect material 232, or there may be a slot 238 between the materials.

During the operation of gated electrochemical cell 200, a fluid including a reductant is present in the first conduit, and a fluid including an oxidant is present in the second conduit. The half-cell reaction of the reductant at the anode catalyst 212 produces electrons and an oxidized product. The electrons produced at the anode can travel through an external circuit to the cathode, where electrons react with the oxidant at the cathode catalyst 222 to produce a reduced product.

The gated electrochemical cell 200 may be turned on and off by switching the membrane gate 230 between conducting and non-conducting states. This switching may be accomplished by changing the electric potential of the gate electrode 234. At a first electric potential, the gate repels protons to a distance that is below the level of the structured membrane which therefore is deficient of mobile carriers and therefore conducts ions at a level that is too low to allow significant reaction at the electrodes. At a second electric potential, the gate permits or attracts a population of mobile carriers at the level of the structured membrane and the membrane conducts ions at a level sufficient to allow significant reaction at the electrodes.

As explanation for this change in ionic conductivity of the membrane gate 230, the carrier population near the gate will reverse with the polarity of the electric field applied by the gate electrode 234. This is similar to the formation of an inversion layer near the surface of a semiconductor substrate in a field effect transistor (FET). A change in the electronic properties of the field effect material 232 can modify the electronic properties of a liquid at or near a surface of the material. If this liquid has sufficient highly mobile ion concentration, it can conduct ions between the first and second conduits 240 and 250, completing the path for the electrochemical cell.

For example, when an electric potential is applied to the gate electrode 234, the electronic properties of the slot 238, may change in response to the applied electric field because the holes, electrons, or ions concentrated in the top layer of the field effect material may move into the slot ion-conductive material, providing an increased concentration of charge carriers in the slot between the two conduits and allowing ions to flow between the liquids in the conduits. The ionic conductivity of the material in the slot 238 is then changed, either increasing or decreasing its conductivity for anions and/or cations. As the height and/or length dimensions of the liquid extending between the conduits decreases, the liquid may become more viscous or solid; however, the ion-conductive material may still conduct ions.

In another example, when an electric potential is applied to the gate electrode 234, holes, electrons, or ions concentrated in a porous field effect material 232 may move into the ion-conductive substances in the pores of the material, providing an increased concentration of charge carriers in the ion-conductive material between the two conduits and allowing ions to flow between the liquids in the conduits. The ionic conductivity of the ion-conductive material within the porous field effect material 232 is changed, either increasing or decreasing its ionic conductivity for anions and/or cations.

Figure 3:
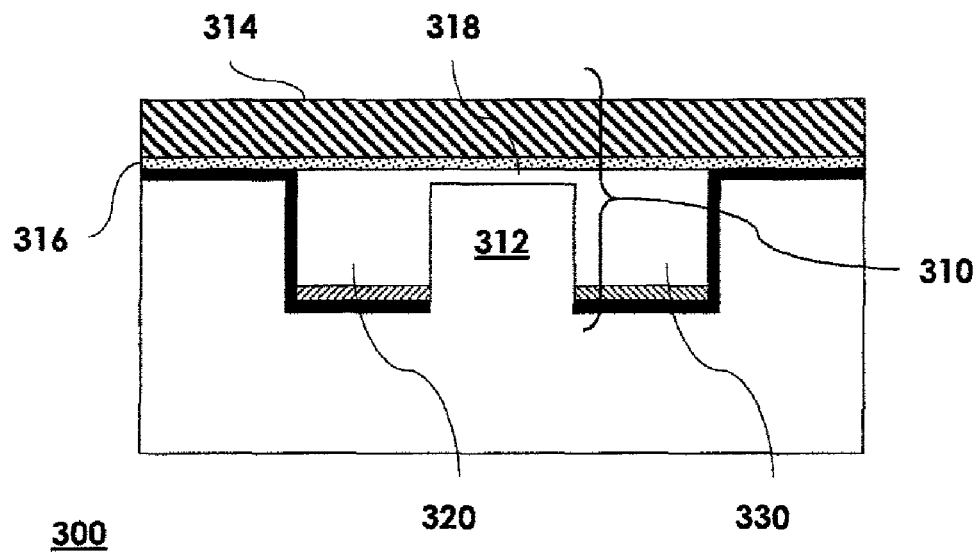
FIG. 3 is a representation of a gated electrochemical cell having a membrane gate that includes a structured field effect material.

FIG. 3 represents an example of an electrochemical cell 300 having a membrane gate 310 that includes a structured membrane filling the slot 318, a gate electrode 314, and a gate insulator 316. The field effect material 312 is separated by slot 318 from the gate insulator 316. The structured membrane filling the slot 318 connects a liquid in a first conduit 320 with a liquid in a second conduit 330. The structured membrane surface may be doped with P- or N-type dopants.

Figure 4:
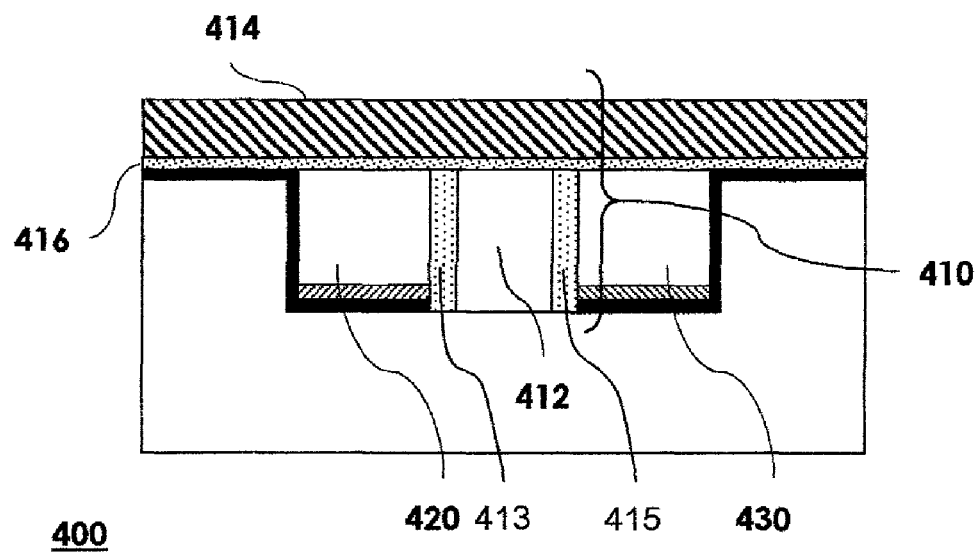
FIG. 4 is a representation of a gated electrochemical cell having a membrane gate that includes a porous field effect material.

FIG. 4 represents an example of a gated electrochemical cell 400 having two structural membranes 413, 415 including a third conduit 412, a gate electrode 414, and a gate insulator 416. The conduit 412 may be filled with water and able to receive fuel molecules from one side and oxidant from the other side without becoming significantly contaminated because the flow of water is sufficient to carry away the amounts that diffuse across the membrane. The central conduit will more fully isolate the electrodes when the gate repels protons but will not be lossy when the protons are attracted to the gate. The membrane gate 410 may completely separate a first conduit 420 from a second conduit 430.

Figure 5:
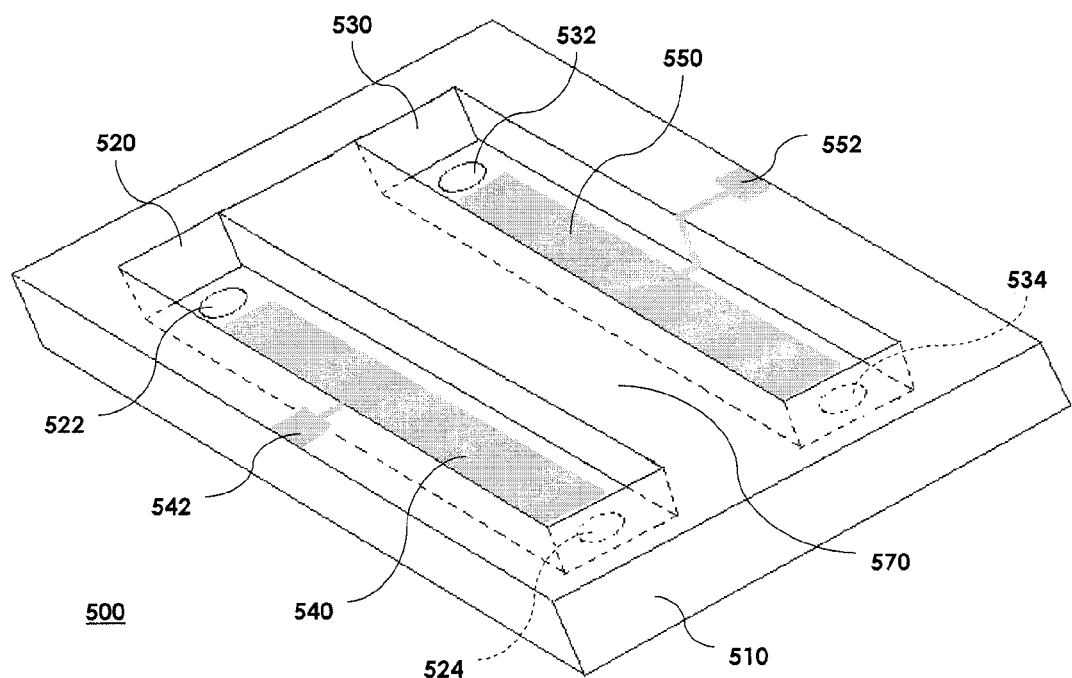
FIG. 5 is a perspective representation of a partially constructed gated electrochemical cell.

FIG. 5 represents a perspective view of a partially constructed gated electrochemical cell. Structure 500 includes a substrate 510, two conduits 520 and 530, an anode 540, a cathode 550, and a separator/membrane 570. Conduit 520 includes an inlet 522 and an outlet 524, and conduit 530 includes an inlet 532 and an outlet 534. Anode 540 and cathode 550 are electrically connected to contacts 542 and 552, respectively. The anode and cathode may be located on the bottoms and/or on the sides of the conduits. The anode and cathode may intersect the inlets and/or the outlets, or the layers may be configured not to contact the inlets and outlets. Membrane/separator 570 may be a structural material or a porous material. Structure 500 may be combined with a cap layer to form an electrochemical cell which may be gated in some configurations.

Figure 6:
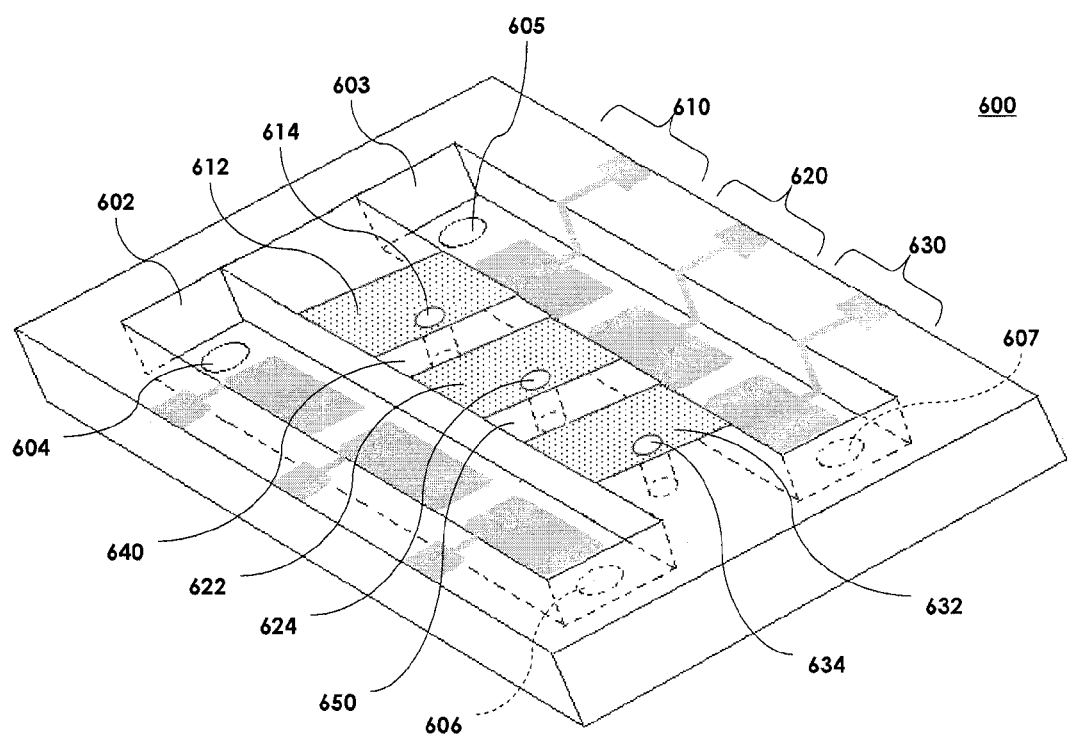
FIG. 6 is a perspective representation of a partially constructed electrochemical cell system.

Individual gated electrochemical cells may be configured to share a common set of conduits. FIG. 6 represents a perspective view of a partially constructed electrochemical cell system 600 including individual electrochemical cells 610, 620 and 630, each of which are connected to conduits 602 and 603. Electrochemical cell 610 includes field effect material 612, electrochemical cell 620 includes field effect material 622, and electrochemical cell 630 includes field effect material 632. The field effect materials 612, 622 and 632 may be separate materials, or they may be integral. The conduits 602 and 603 contain inlets 604 and 605, and outlets 606 and 607, respectively.

The individual electrochemical cells 610, 620 and 630 may be separated by isolation regions 640 and 650, such that the on or off status of one of the electrochemical cells does not affect the status of the other electrochemical cells. The isolation regions may be formed as part of the patterned etching of the field effect material and/or the conduits, or the isolation regions may be formed separately. Each electrochemical cell may also include a via 614, 624 or 634 through the field effect material near the isolation regions or near the outlets. These vias can drain liquid from the space above the field effect material, which may help to remove reaction products and replenish the liquid between the conduits.

Gated electrochemical cells may be formed using standard semiconductor processing techniques. Examples of processes in semiconductor manufacturing include lithography, etching, polishing, chemical vapor deposition (CVD), and physical vapor deposition (PVD). Semiconductor processes for use in the present invention are well known to those of ordinary skill in the art, and are also described in Encyclopedia of Chemical Technology, Kirk-Othmer, Volume 14, pp. 677-709 (1995); Semiconductor Device Fundamentals, Robert F. Pierret, Addison-Wesley, 1996; Wolf, Silicon Processing for the VLSI Era, Lattice Press, 1986, 1990, 1995 (vols 1-3, respectively); Microchip Fabrication 4th. edition, Peter Van Zant, McGraw-Hill, 2000.

FIGS. 7A to 7F represent structures formed during an example of a method of making a gated electrochemical cell. In FIG. 7A, structure 700 includes a substrate 702, two conduits 704 and 705, an intermediate region 706 between the two conduits, and walls 708 and 709. The intermediate region 706 has a difference in height 707 relative to the height of the walls 708 and 709.

The substrate 702, intermediate region 706, and walls 708 and 709 may be integral, they may be the same material, or they independently may be different materials. In one example, the substrate and walls are insulators, and the intermediate region is a semiconductor. In another example, the substrate and intermediate region are semiconductors, and the walls are insulators. In another example, the substrate, walls and intermediate region are integral. In another example, the substrate, walls and intermediate region are integral and are formed from a single semiconductor substrate. Semiconductor materials may be doped or undoped, and the doping may be uniform, or it may vary depending on the location within the material. The intermediate region 706 may be a semiconductor. The intermediate region may be a field effect material, or the intermediate region may be converted to a field effect material through doping, or chemical reaction. In the case of logic and fuel cells on a single substrate it is appropriate that the divider is silicon but in the case of fuel cells formed from plastics the options for the divider can be much broader.

The structure 700 may be formed from a single semiconductor substrate, for example by micromachining or by lithographic techniques. In an example of a lithographic method, the intermediate region and conduits together are three minimum line-widths wide (minimum line-width is also referred to as critical dimension or CD). The depth of the intermediate region, corresponding to height difference 707, may be from 0.01 to 0.2 times the depth of the conduits.

In FIG. 7B, structure 710 includes conductive layers 712 and 714 in each conduit 704 and 705. The conductive layers may also be on at least a portion of the walls to facilitate a connection between the conductive layer and an external switch or load. This is illustrated in FIG. 7C, where structure 711 includes conductive layers 712 and 714 on walls 708 and 709. In FIG. 7D, structure 720 includes an anode catalyst 722 and a cathode catalyst 724 on the conductive layers 712 and 714, respectively.

To form inlets and outlets for a conduit, vias may be formed at each end of the conduit. In FIG. 7E, structure 730 includes vias 732 and 734 in conduits 704 and 705. The vias may be formed at any point in the fabrication process. The vias may intersect the electrode layers (712, 714) and/or the catalyst layers (722, 724) as shown, or they may only contact the substrate 702.

In FIG. 7F, structure 740 includes a cap layer 742 that is bonded to the walls 708 and 709 and that extends over the conduits 704 and 705 and the intermediate region 706. The cap layer 742 includes an insulating layer 744 and a conducting layer 746, and is separated from the intermediate region by slot 748. Structure 740 can be a gated electrochemical cell having a membrane gate that includes a structural field effect material.

In one example, the cap layer 742 may be formed by first depositing a tenting resist film over structure 720 and/or 730, such that the film contacts the walls 708 and 709 but does not contact the intermediate region 706. The resist film can be etched in a pattern to expose features such as electrical contact areas or dicing lines. An insulating layer may be formed on the resist film, or the resist film can be the insulating layer. A conducting layer can then be deposited to complete the cap layer. In another example, the cap layer may be formed in a separate process and then contacted with the walls 708 and 709. A sealant such as a glop-top layer may be applied to some or all of structure 740, to ensure that the electrochemical cell can sustain the fluid pressures experienced during operation.

Figure 8A:
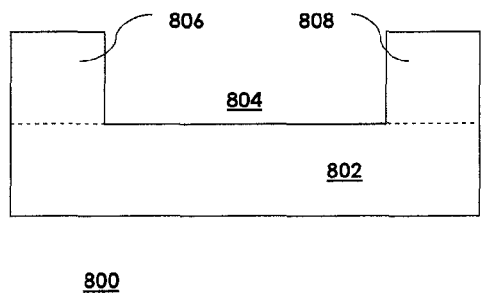
FIG. 8A through FIG. 8F are representations of structures formed during an example of a method of making a gated electrochemical cell having a membrane gate that includes a porous field effect material.

FIGS. 8A to 8F represent structures formed during another example of a method of making a gated electrochemical cell. In FIG. 8A, structure 800 includes a substrate 802 and a trench 804 having walls 806 and 808. The substrate 802 and walls 806 and 808 may be integral, they may be the same material, or they independently may be different materials. In one example, the substrate and walls are insulators. In another example, the substrate is a semiconductor, and the walls are insulators. In another example, the substrate and walls are integral. In another example, the substrate and walls are integral and are formed from a single semiconductor substrate, for example, by micromachining or by lithography. Semiconductor materials may be doped or undoped, and the doping may be uniform, or it may vary depending on the location within the material.

Figure 8B:
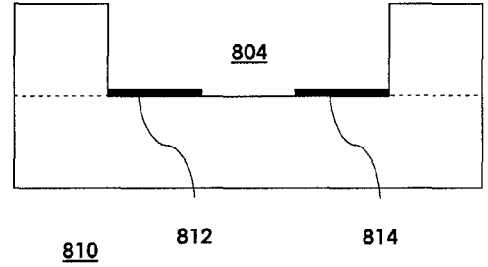
Figure 8C:
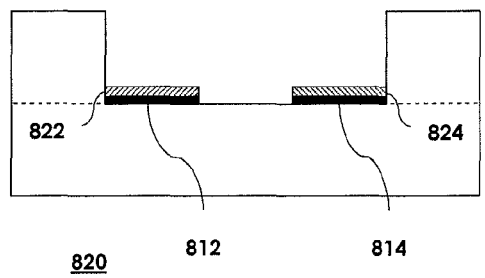
Figure 8D:
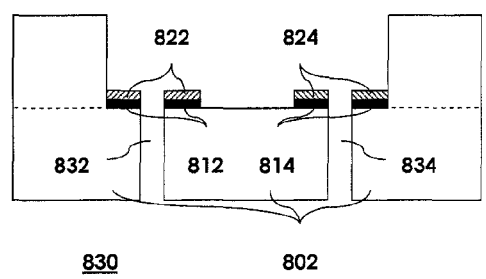

In FIG. 8B, structure 810 includes conductive layers 812 and 814 on two separate portions of the trench 804. In FIG. 8C, structure 820 includes an anode catalyst 822 and a cathode catalyst 824 on the conductive layers. In FIG. 8D, structure 830 includes vias 832 and 834 in the semiconductor substrate 802. These vias may provide inlets and outlets for the conduits, and may be formed at any point in the fabrication process. The vias may intersect the electrode layers (812, 814) and/or the catalyst layers (822, 824) as shown, or they may only contact the substrate 802.

Figure 8E:
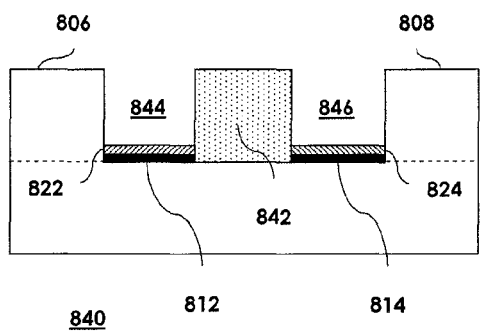
Figure 8F:
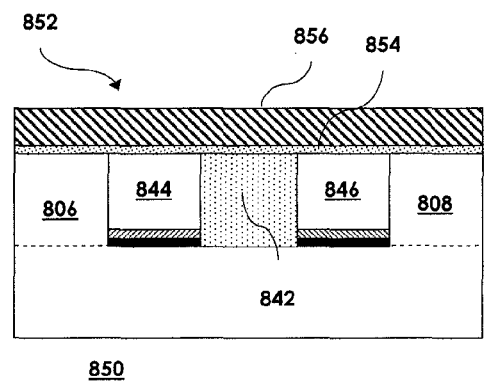

In FIG. 8E, structure 840 includes a porous field effect material 842 between the anode catalyst 822 and conductive layer 812, and the cathode catalyst 824 and conductive layer 814. Conduits 844 and 846 are thus formed between the porous field effect material 842 and the walls 806 and 808. In FIG. 8F, structure 850 includes a cap layer 852 that is bonded to the walls 806 and 808 and that extends over the conduits 844 and 846. The cap layer 852 may contact the porous field effect material 842, or there may be a space between them. The cap layer 852 includes an insulating layer 854 and a conducting layer 856. Structure 850 can be a gated electrochemical cell having a membrane gate that includes a porous field effect material.

In one example, the cap layer 852 may be formed by first depositing a tenting resist film over structure 840, such that the film contacts the porous field effect material 842 and walls 806 and 808. The resist film can be etched in a pattern to expose features such as electrical contact areas or dicing lines. An insulating layer 854 may be formed on the resist film, or the resist film can be the insulating layer 854. A conducting layer can then be deposited to complete the cap layer. In another example, the cap layer may be formed in a separate process and then contacted with the porous field effect material 842 and walls 806 and 808. A sealant such as a glop-top layer may be applied to some or all of structure 850, to ensure that the electrochemical cell can sustain the fluid pressures experienced during operation.

A gated electrochemical cell may be supplied with reactants by a microfluidic system. A microfluidic system may include reservoirs for the liquids containing the reductant and oxidant, microfluidic channels for the liquids, and a pump to induce liquid flow in the channels. A microfluidic system may include additional components, such as one or more flow control devices, a recycling system, and temperature controls.

A microfluidic system may include a microfluidic channel that directs fluid from a reservoir to an inlet in a conduit in a gated electrochemical cell. The microfluidic system may also include a microfluidic channel that directs fluid from an outlet in a gated electrochemical cell conduit to a waste receptacle or to a recycling system.

The microfluidic system may be formed in a substrate that is then attached to the back side of the substrate of a gated electrochemical cell. Registration of the two substrates to each other can provide for alignment of the inlet and outlet vias with the corresponding microfluidic channel for the reductant inlet, reductant outlet, oxidant inlet and oxidant outlet. The microfluidic system may be formed in the substrate of the gated electrochemical cell. For example, the microfluidic channels may be formed on one side of a substrate, and the trench or conduits for the electrochemical cell may be formed on the other side of the same substrate, or on the same side.

Access to the conduits of the electrochemical cell can be achieved by etching vias through the substrate and/or by forming openings through the cap layer. In one example, the inlets to the two conduits pass through the cap layer, and the outlets from the two conduits pass through the substrate. In this example, the microfluidic supply channels are above the electrochemical cell, and the microfluidic return channels are below the electrochemical cell. In another example, the inlet and outlet for one of the conduits pass through the cap layer, and the inlet and outlet for the other conduit pass through the substrate. In this example, the microfluidic channels for each reactant are on opposite sides of the electrochemical cell. In another example, all of the microfluidic channels are on one side of the electrochemical cell and have access to the appropriate conduits through vias in the substrate.

Figure 9:
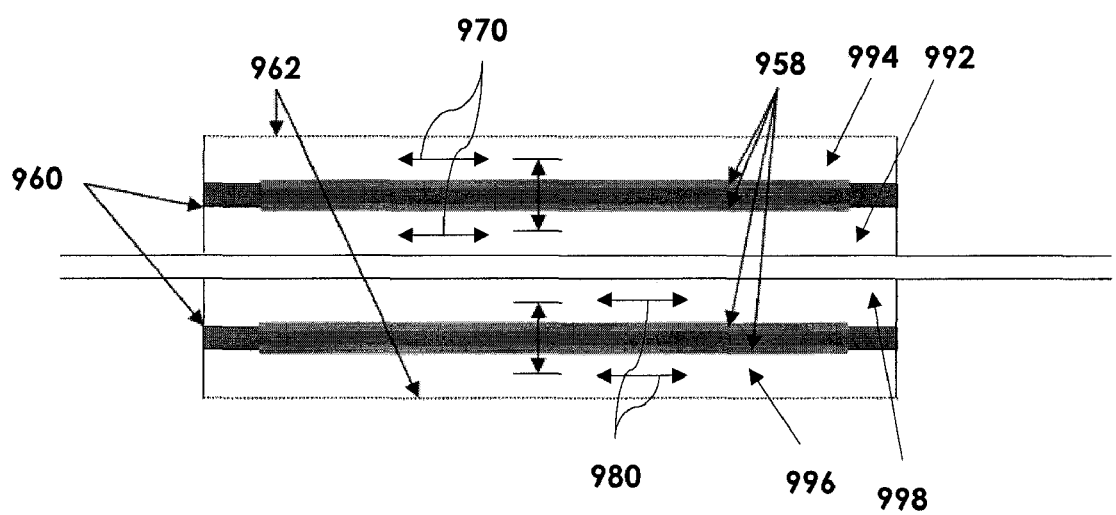
FIG. 9 is a representation of a piezoelectric pump.

Examples of pumps include mechanical pumps and piezoelectric pumps. Mechanical pumps include, for example, syringe pumps and pistons. FIG. 9 represents an example of a piezoelectric pump for a microfluidic system.

A flow control device may be present in a microfluidic system to control the amount and/or direction of fluid flow. Flow control devices may be especially useful in a microfluidic system that processes fluid for more than one set of conduits. Examples of flow control devices include solenoid valves, and piezoelectric valves.

A recycling system may be present in a microfluidic system to isolate reaction products or contaminants from the reactant fluids. Each fluid from the conduit outlets may have a dedicated recycling system, or the two fluid s may share a common recycling system. An electrochemical cell may be operated such that one or both of the reactants is completely consumed during the cell reaction, such that the exiting fluid includes only carrier gas or liquid that can be directed back to a fluid reservoir. In addition, fluid that may drain directly from the slot of an electrochemical cell having a structured field effect material may be recycled, vented, or directed to a waste receptacle. If the slot liquid is recycled, it may have a dedicated recycling system, or it may share a recycling system with one or both of the conduit fluids.

Temperature controls may be present in a microfluidic system to dissipate heat that may build up in the fluids. The temperature of a fluid in a gated electrochemical cell may increase due to an exothermic reaction between the reactants and the catalyst. The temperature of a fluid in a gated electrochemical cell may increase due to the electrical dissipation in a load connected to the cell.

In one example, the fluid temperature may be controlled by a heat exchanger. For example, microfluidic channels may pass through a thermally conductive material, which may be configured with plates that allow heat to be radiated to the surrounding environment.

A gated electrochemical cell may be connected to a semiconductor structure or a semiconductor device. When the structure or device is accessed in a processing operation, the power required to operate the structure or device may be provided at least in part by the electrochemical cell.

One or more semiconductor structures may be formed on the same semiconductor substrate as a gated electrochemical cell.

One or more semiconductor structures may be formed in a stacking arrangement with a gated electrochemical cell. For example, a gated electrochemical cell may have a cap layer that is sufficiently flat to allow for further semiconductor processing. The top portion of the cap layer thus becomes the substrate for forming one or more semiconductor structures.

The following examples are provided to illustrate one or more embodiments of the invention. Numerous variations may be made to the following examples that lie within the scope of the invention.

EXAMPLES

Example 1

Fabrication of a Gated Electrochemical Cell Integrated with a Logic Module

Figure 10:
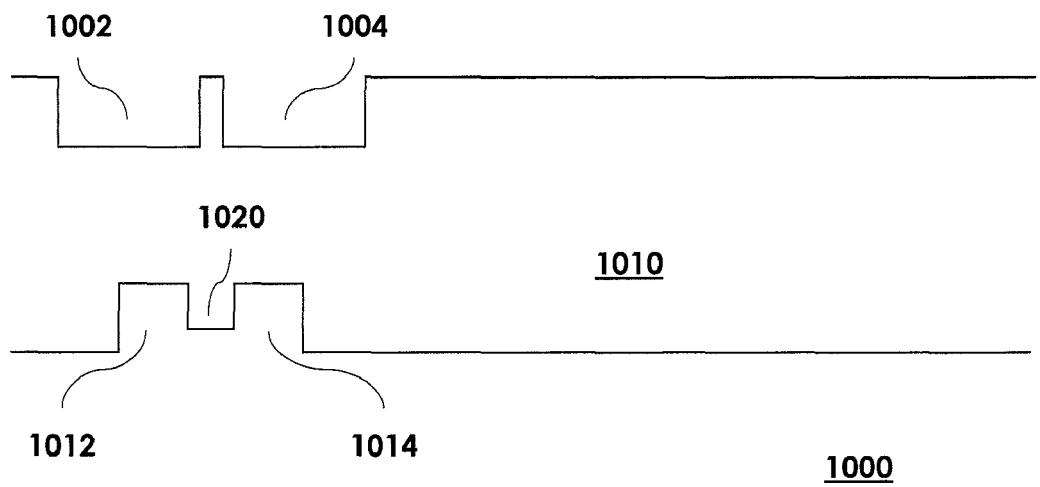
FIG. 10 through FIG. 13 illustrate structures formed during fabrication of a gated electrochemical cell integrated with a logic module.

A silicon wafer is etched on both sides with different patterns. On one side, the pattern corresponds to microfluidic channels for a microfluidic network. Separate microfluidic channels are formed for reductant inlet, reductant outlet, oxidant inlet, oxidant outlet, and mixed liquid drain. On the other side, the pattern corresponds to pairs of conduits for one or more electrochemical cells, and an intermediate region between the conduits. The depth and with dimensions of the conduits independently are between 10 and 200 microns. The intermediate region has a width on the order of the conduit widths, and a depth of from 20 nanometers to 5 microns. The etching may be performed using semiconductor fabrication techniques or micromachining. FIG. 10 is a representation of a structure 1000 that includes wafer 1010 in which microfluidic channels 1002 and 1004, conduits 1012 and 1014, and an intermediate region 1020 have been formed.

Figure 11:
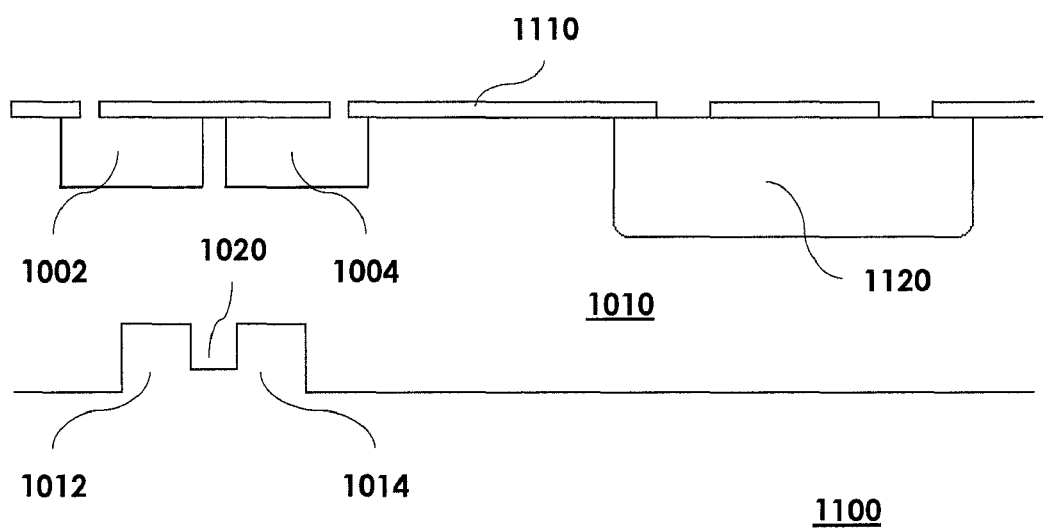

A logic module containing one or more transistors is formed on the side of the wafer containing the microfluidic network. A tenting resist film is applied over the microfluidic network and logic. The tenting resist is patterned to provide fluid access to the microfluidic network and to provide electrical access to the logic. The logic module and patterned tenting resist film are formed using conventional semiconductor processing techniques. FIG. 11 is a representation of a structure 1100 that may be formed from structure 1000. Structure 1100 includes wafer 1010, microfluidic channels 1002 and 1004, conduits 1012 and 1014 separated by intermediate region 1020, patterned tenting resist film 1100, and logic module 1120.

Figure 12:
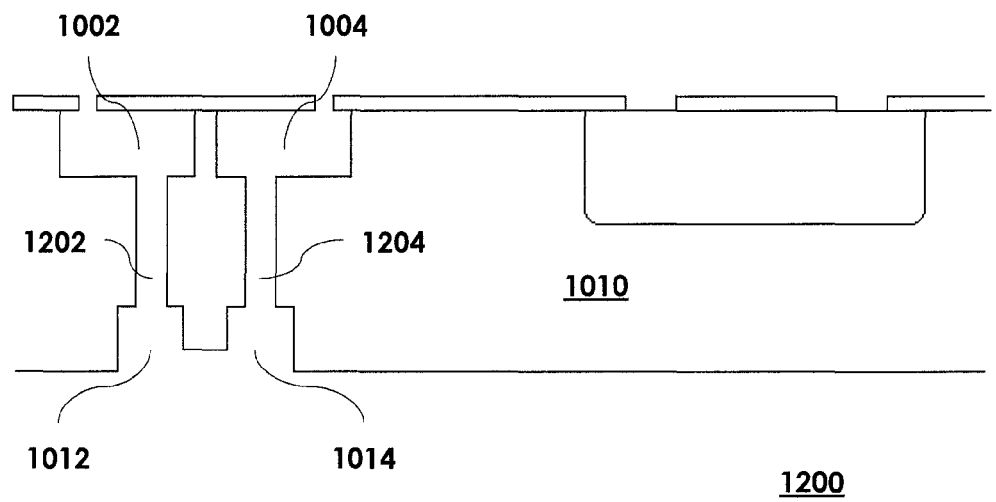

A photoresist layer is applied to the conduit side of the wafer. The layer is patterned, and then vias are etched from the conduits to the microfluidic channels. These vias can provide fluid inlets and outlets to the conduits. FIG. 12 is a representation of a structure 1200 that may be formed from structure 1100. Structure 1200 includes vias 1202 and 1204 through wafer 1010, connecting microfluidic channels 1002 and 1004 with conduits 1012 and 1014, respectively.

The conduit side of the wafer is again covered with a patterned photoresist. A layer of nickel is formed on the base of each conduit between the inlet and outlet vias, and extends out of the conduits to form interconnect areas. Another patterned photoresist is formed, and gold is deposited by electrolysis onto portions of the nickel layer, forming the electrode areas in the base of each conduit. A platinizing solution containing 3 grams of chloroplatinic acid and 0.02 grams of lead acetate in 100 grams of distilled water is then contacted with each electrode, and a layer of black platinum is formed. The photoresists are removed to provide the anode and cathode in the conduits.

Figure 13:
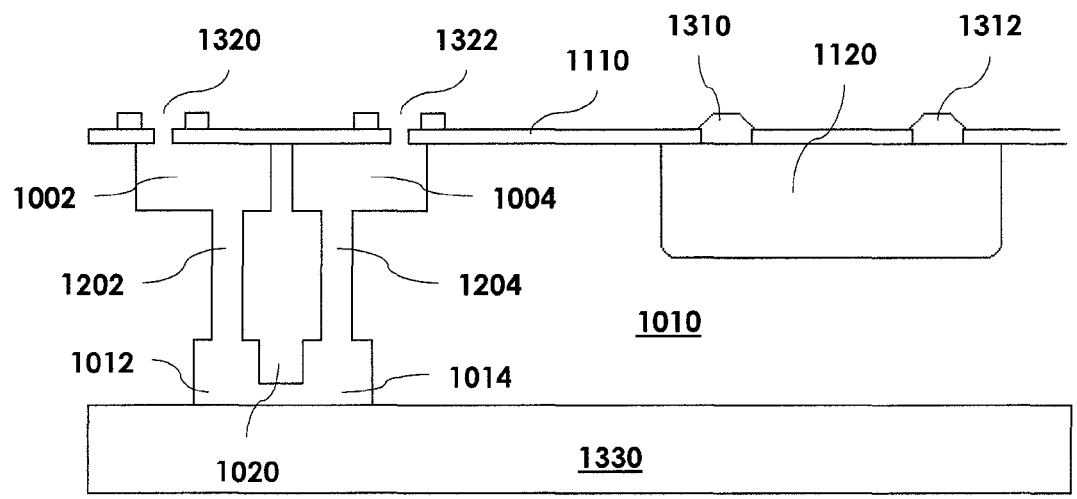

The assembly of the electrochemical cell is completed by bonding the side of the wafer having the conduits to a substrate. The conduits are sealed, with the only inlets and outlets located at the vias. Solder bumps are formed on the resist openings above the logic module by flip-chip application. The resist openings above the microfluidic channels are surrounded with low temperature port connect rings by jet printing a thermosetting paste. The rings solidify to become connecting tubes to mounting inlet and outlet tubes. FIG. 13 is a representation of a structure 1300 that may be formed from structure 1200. Structure 1300 includes wafer 1010 having microfluidic channels 1002 and 1004, conduits 1012 and 1014, vias 1202 and 1204, and intermediate region 1020; patterned tenting resist film 1100; logic module 1120; solder bump connects 1310 and 1312; fluid connects 1320 and 1322; and cap layer 1330.

Example 2

Combination of a Printed Circuit Board with an Integrated Gated Electrochemical Cell/Logic Module Gated electrochemical cells, such as the cell formed in Example 1, are connected to a microfluidic network and used to provide power to their integrated logic modules. The process of Example 1 may be used to form multiple integrated electrochemical cells and associated logic modules, and a single substrate containing one or more of these integrated electrochemical cell/logic modules is referred to as a "chip." One or more chips may be mounted to a circuit board.

Once the conventional layers of metal on a printed circuit board have been processed, such as by etching and through-hole plating, a patterned protective layer is applied in the form of a conformal coating or a film-type photosensitive elastomer and then cured to a hard refractory surface. To produce channels for the reactant liquids, a second layer is applied and then selectively removed. The pattern of this layer includes the fluid channels as well as openings for electrical contacts. A top layer is then formed over this layer by deposition of a tenting resist film to seal the fluid channels. The top layer is patterned to provide openings for the electrical contacts.

Fluid contacts are formed through the circuit board to the microfluidic network. Chips may be connected to the printed circuit board by aligning the fluid connects and solder bumps of the chips with the electrical contacts and fluid contacts of the board.

Figure 14:
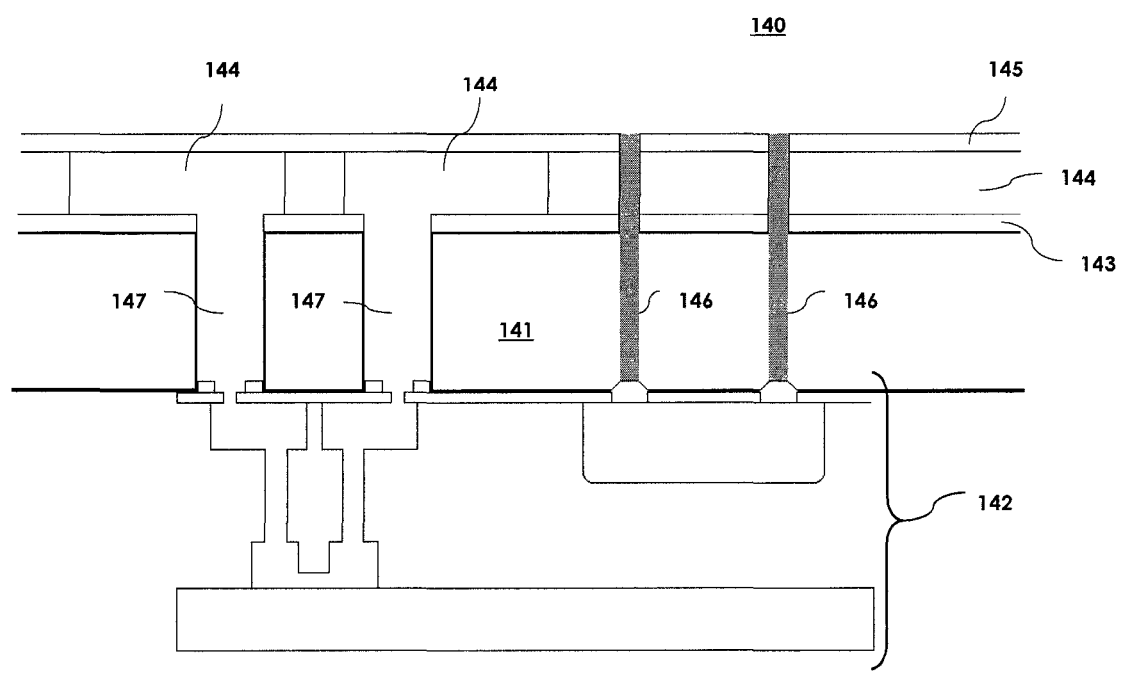
FIG. 14 is a representation of a printed circuit board with an integrated gated electrochemical cell/logic module.

FIG. 14 is a representation of a structure 1400 including a printed circuit board 1410 connected to a chip 1420, a patterned protective layer 1430, a fluid channel layer 1440, and a top layer 1450. Electrical contacts 1460 and 1462 extend through the layers and the printed circuit board 1410 to connect to the logic module of the chip 1420. Fluid contacts 1470 and 1472 provide two of the fluid connections between fluid channels 1442 and 1444 with the microfluidic network of the chip 1420.

Figure 15:
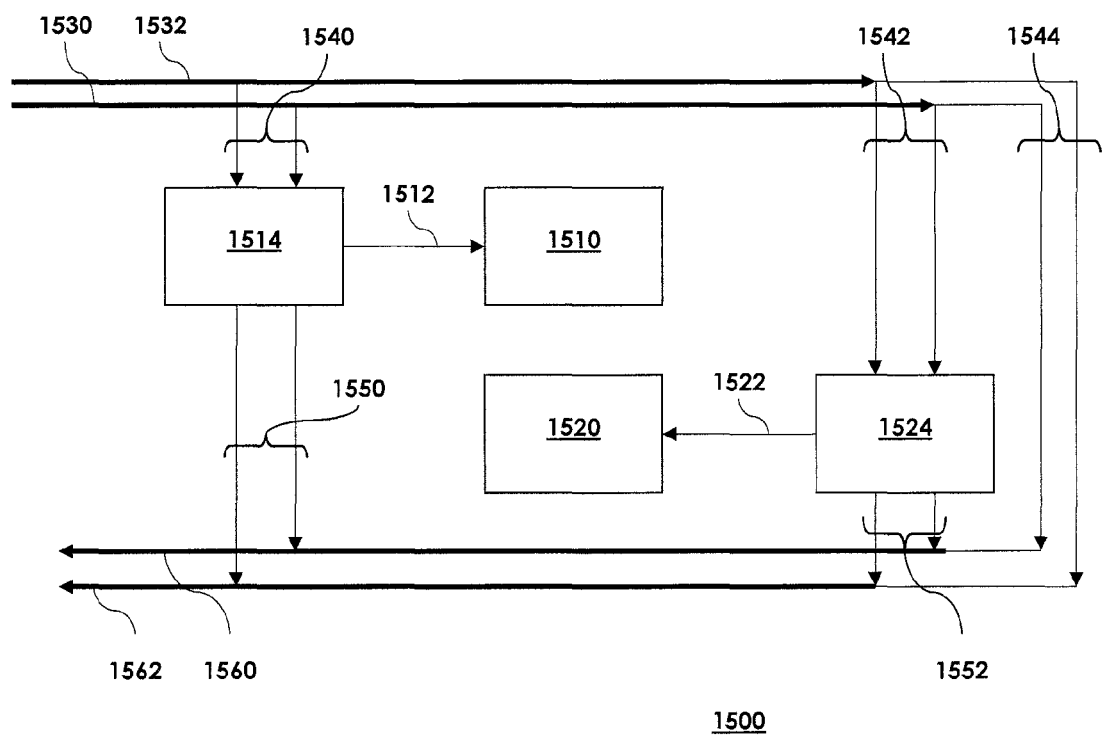
FIG. 15 is a schematic representation of a chip including two integrated gated electrochemical cell/logic modules.

FIG. 15 is a schematic representation of a chip 1500 including two logic modules 1510 and 1520 independently powered through electrical connections 1512 and 1522 by integrated electrochemical cells 1514 and 1524, respectively. The reductant and oxidant are directed to the microfluidic network of the chip under a regulated absolute pressure through fluid contacts 1530 and 1532, respectively. Microfluidic channels on the chip split to form three pairs of streams, each pair including a reductant stream and an oxidant stream. Inlet pairs 1540 and 1542 are each directed to a separate electrochemical cell. Pair 1544 is directed through a pattern under the chip to collect heat and to establish the desired pressure drop. Outlet pairs 1550 and 1552 from the electrochemical cells are combined with pair 1544, and the used reductant and oxidant liquids are removed from the chip through fluid contacts 1560 and 1562.

Example 3

Self-Contained Gated Electrochemical Cell/Logic Module System

Figure 16:
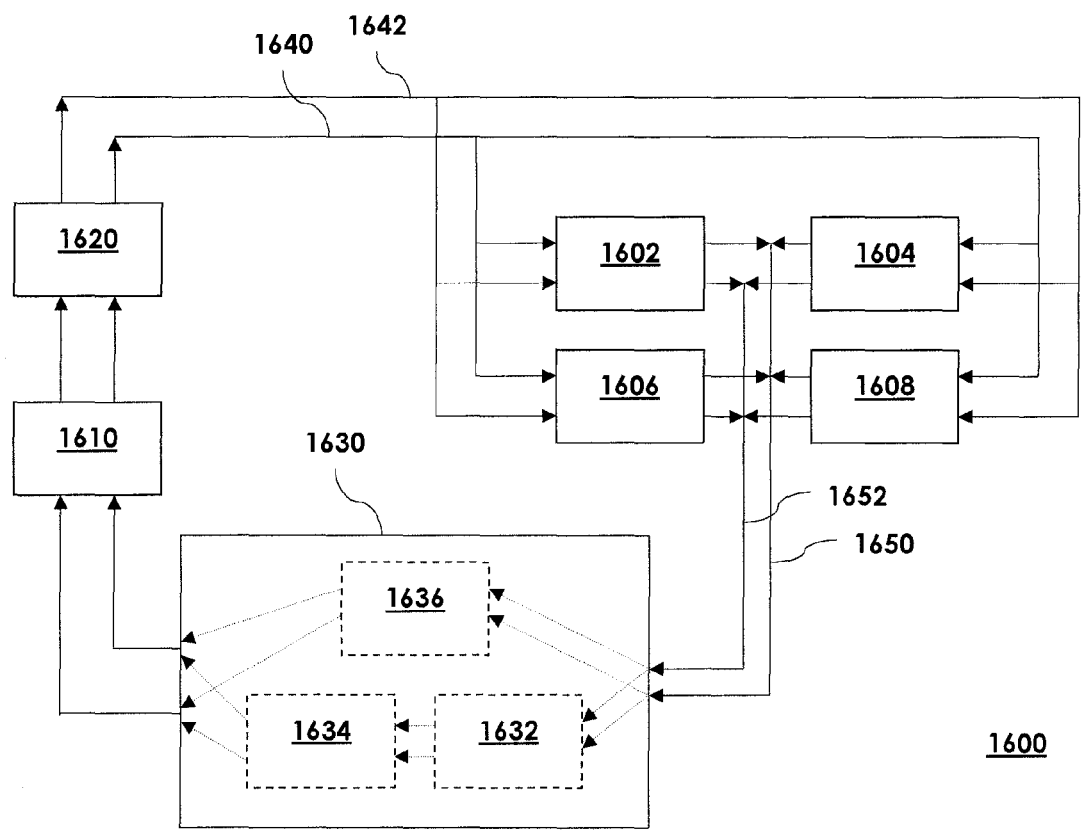
FIG. 16 is a schematic representation of a microelectronic system including multiple integrated gated electrochemical cell/logic modules.

A circuit board containing one or more chips, such as the circuit board formed in Example 2, is connected to a microfluidic system to provide a fully functional, self-contained microelectronic system. FIG. 16 is a schematic representation of a microelectronic system 1600 including multiple chips 1602, 1604, 1606 and 1608; reservoir 1610; pump 1620; recycler 1630; fluid channels 1640 and 1642; and microfluidic outlet channels 1650 and 1652.

A reductant liquid stream and an oxidant liquid stream are produced from reservoir 1610 by pump 1620. The reservoir and pump each include separate components for processing the reductant liquid and the oxidant liquid. The pump is powered by an external power supply, such as a battery, an alternating current source, or a separate electrochemical cell. Once one or more of the chips (1602, 1604, 1606, 1608) is switched on to produce an electric current, the pump is powered at least in part by the electrochemical cells of the chips. The reductant liquid and the oxidant liquid are directed to the chips through fluid channels 1640 and 1642, respectively. The pressure of each liquid is regulated to be a standard operation pressure that stabilizes the delivery rates of the reactants to the chips. Each of the inlet channels 1640 and 1642 are split into separate microfluidic inlet pairs for each chip, such that each inlet pair has the same pressure drop.

After passing through the electrochemical cell conduits in the chips, the liquids are directed away from the chips through microfluidic outlet pairs, which are combined into outlet channels 1650 and 1652. The outlet channels direct the liquids to the recycler 1630. The recycler separates the carrier liquid, reaction products and/or residual reactants from the liquid streams. The recycler may include optional evaporator 1632 to selectively separate gas phase components from the liquids. Gas phase from the evaporator is processed by optional gas chromatograph 1634, to isolate components such as water, carbon dioxide, and residual reactants. The recycler may include optional liquid chromatography system 1636, which includes one or more liquid chromatographs for separation of the components of the liquid. The waste components of the outlet liquids are either vented or directed to a waste receptacle. Any reactants that have crossed over, for example reductant in the oxidant liquid or oxidant in the reductant liquid, are separated and recombined with the appropriate liquid. There may be a stabilization period at startup when contamination in the liquids will increase before the purification process begins to be effective. The carrier liquids and residual reactants are directed back to the reservoir 1610. The reservoir may serve as a heat exchanger for the liquids, dissipating excess heat from the liquids prior to recirculating the liquid through the system.

Example 3

It is also possible to construct all of the fuel cell conduits and components on one side of the wafer and all of the logic on the other. This has a penalty in flexibility of the fuel cells but greatly simplifies the processing of the logic.

While various embodiments of the gated fuel cell have been described as being able to be built on a silicon wafer in a foundry it will be apparent to those of ordinary skill in the art that by omission of the gate the invention may equally be used to produce un-gated fuel cells, with or without a membrane, on a silicon wafer in a foundry. It is also apparent that the processes to make the fuel cells function do not depend on silicon foundry processes and can be equally achieved with a variety of materials by striking, extruding, rolling, vacuforming and many other industrial processes. The small size in two dimensions easily permits densely placing the cells on one or two sides of thin material and stacking many layers to produce high power density fuel cell structures of various voltages, currents and numbers of outputs.

While various embodiments of the invention have been described, it will be apparent to those of ordinary skill in the art that other embodiments and implementations are possible within the scope of the invention. Accordingly, the invention is not to be restricted except in light of the attached claims and their equivalents.

We claim:

1. An electrochemical cell, comprising:
    a first half-cell comprising: at least one first electrode, and a first reactant;
    a second half-cell comprising: at least one second electrode, and a second reactant;
    at least one conductive contact separately electrically connected to each of: the at least one first electrode, and the at least one second electrode; and
    at least one membrane gate comprising:
        at least one separator comprising a field effect material with ion conductivity, wherein the at least one separator is interposed between the first half-cell and the second half-cell, wherein the at least one separator limits the mixing of the first reactant and the second reactant;
        at least one gate insulator; and
        at least one gate electrode; wherein the at least one gate insulator is interposed between the at least one gate electrode and the at least one conductive contact;
            wherein the at least one separator, the at least one gate insulator, and the at least one gate electrode are positioned so that an electric potential applied to the gate electrode influences the first electrode electrical potential with respect to the second electrode electrical potential.

2. The electrochemical cell of claim 1 further comprising:
at least one channel enclosing at least one flowing liquid stream and contiguous with at least part of at least one electrode.

3. The electrochemical cell of claim 2, further comprising at least one pump to induce flow in the at least one flowing liquid stream in the at least one channel.

4. The electrochemical cell of claim 2, wherein the flow of the at least one flowing liquid stream is laminar and the at least one separator is an induced dynamic conducting interface.

5. The electrochemical cell of claim 1, wherein the at least one separator is a polymer electrolyte membrane.

6. The electrochemical cell of claim 1, wherein the at least one separator is a structured membrane comprising a lattice having non ion-permeable sides with inclusions of an ion-permeable substance in a form that is altered by the proximity of the sides of the lattice.

7. The electrochemical cell of claim 2 further comprising the at least one additional flowing liquid stream between the first reactant and the second reactant able to accept ions without becoming significantly contaminated.

8. The electrochemical cell of claim 2 wherein the second half-cell is located farther downstream along the at least one channel than the first half-cell.

9. The electrochemical cell of claim 2, wherein the at least one channel comprises a relief pattern into a surface and a mating cover that completes its closure.

10. The electrochemical cell of claim 1, wherein the at least one separator is a porous matrix with the pores filled with ion-permeable gel.

11. The electrochemical cell of claim 2, wherein the at least one gate electrode is two or more isolated gate electrodes sequentially positioned along the stream to influence the at least one first electrode electrical potential with respect to the at least one second electrode electrical potential.

12. The electrochemical cell of claim 2, wherein the at least one gate electrode is two or more isolated gate electrodes sequentially positioned to independently influence the at least one first electrode electrical potential or the at least one second electrode electrical potential of successive positions progressing downstream.

13. The electrochemical cell of claim 1, wherein the separator is wetted by electrolytes.

* * * * *